United States Patent Office 2,937,507
Patented May 24, 1960

2,937,507

METHOD AND APPARATUS FOR UTILIZING HOT AND COLD SIDE OF REFRIGERATION FOR THE DEHYDRATION OF HEAT SENSITIVE MATERIALS

Harry A. Toulmin, Jr., Dayton, Ohio, assignor, by mesne assignments, to Union Carbide Corporation, New York, N.Y., a corporation of New York Filed Sept. 16, 1955, Ser. No. 534,756

10 Claims. (Cl. 62—123)

The present invention relates to low temperature dehydration of heat sensitive materials, more particularly, to a system and method for utilizing within the system the ice crystals removed from the dehydrated materials.

While several processes for the dehydration of heat-sensitive materials have been devised, the step freeze process has had extensive use. In this process a batch of the material is successively circulated through a plurality of freeze tanks, which are maintained at progressively lower temperatures. Each succeeding freeze tank removes a portion of the water from the material in the form of ice crystals and the combined dehydrating action of the freeze tanks results in a concentrated material.

The principal advantage of employing the step freeze process is that sensitivity of control can be exercised at all times over the material during the freezing process.

The disadvantages of the step-freeze process reside primarily in the operating costs and the time consumed in completely dehydrating a batch of heat-sensitive material. In order to provide concerned industries with a more efficient and economical step freeze process, considerable attention has been devoted toward reducing the operating costs of step freeze systems.

In the conventional step freeze dehydrating system a plurality of freeze tanks are maintained at progressively lower temperatures by being connected to the cold side of a refrigeration system. The ice crystals which are removed from the heat-sensitive material at the conclusion of each freezing step are usually disposed of as waste products of the process. It has been determined however that by utilizing the ice crystals within the system for both heating and cooling purposes considerable savings in cost may be effected.

In the present invention a plurality of conventional step-freeze tanks are connected to the cold side of a refrigeration system. The hot side of the refrigeration system, however, is connected to a receptacle which receives the ice crystals removed in the tanks. The receptacle is then connected to enable the ice crystals, together with any entrained solids, to be utilized to cool the compressor and condenser of the refrigeration system. The use of the ice crystals as a coolant in the hot side of a refrigeration system will result in melting of the ice crystals and a rise in temperature of the resultant melted water. The melted water may then be suitably treated in order to remove any entrained solids. These solids may then be used to reconstitute the heat-sensitive material.

The present invention additionally discloses modifications of this system which also result in economical use of the ice crystals removed during the freezing process. In one modification the hot side of the refrigeration system is connected with the receptacle receiving the ice crystals and the freezing tanks to permit circulation of the melted ice crystals through the freezing tanks at selected intervals. The heat accumulated by the water during its passage through the hot side of the refrigeration system will cause defrosting of the freeze tanks. The result is an economical removal of the heavy accumulation of ice from the freezing apparatus in the step-freeze tanks.

An additional modification of this invention provides for the warmed water to be circulated through a jacketed trough. The action of the warm water together with aseptic lamps will asepticize the dehydrated product as it flows through the trough.

After the melted water has been passed through the asepticizing trough it is treated for removal of any entrained solids therein. Furthermore, the water is circulated through the freeze tanks for defrosting of the tanks in the manner previously mentioned.

It is therefore the principal object of this invention to provide an efficient and economical system for the low temperature dehydration of aqueous heat-sensitive materials.

It is a further object of this invention to provide a method and apparatus for utilizing a source of refrigeration in a low temperature dehydrating system for both heating and cooling functions within said system.

It is an additonal object of this invention to provide a method and apparatus for utilizing ice crystals removed from dehydrated materials in cooling components of a refrigeration system.

It is another object of this invention to provide a method and apparatus for utilizing ice crystals removed from a dehydrated material for defrosting the equipment employed in freezing the material.

It is a still further object of this invention to provide a method and apparatus for melting ice crystals removed from a dehydrated material and employing the melted ice crystals as a heating medium and ascepticizing the material.

Other objects and advantages of this invention will become apparent upon reference to the accompanying description when taken in conjunction with the following drawings, wherein.

Figure 1:
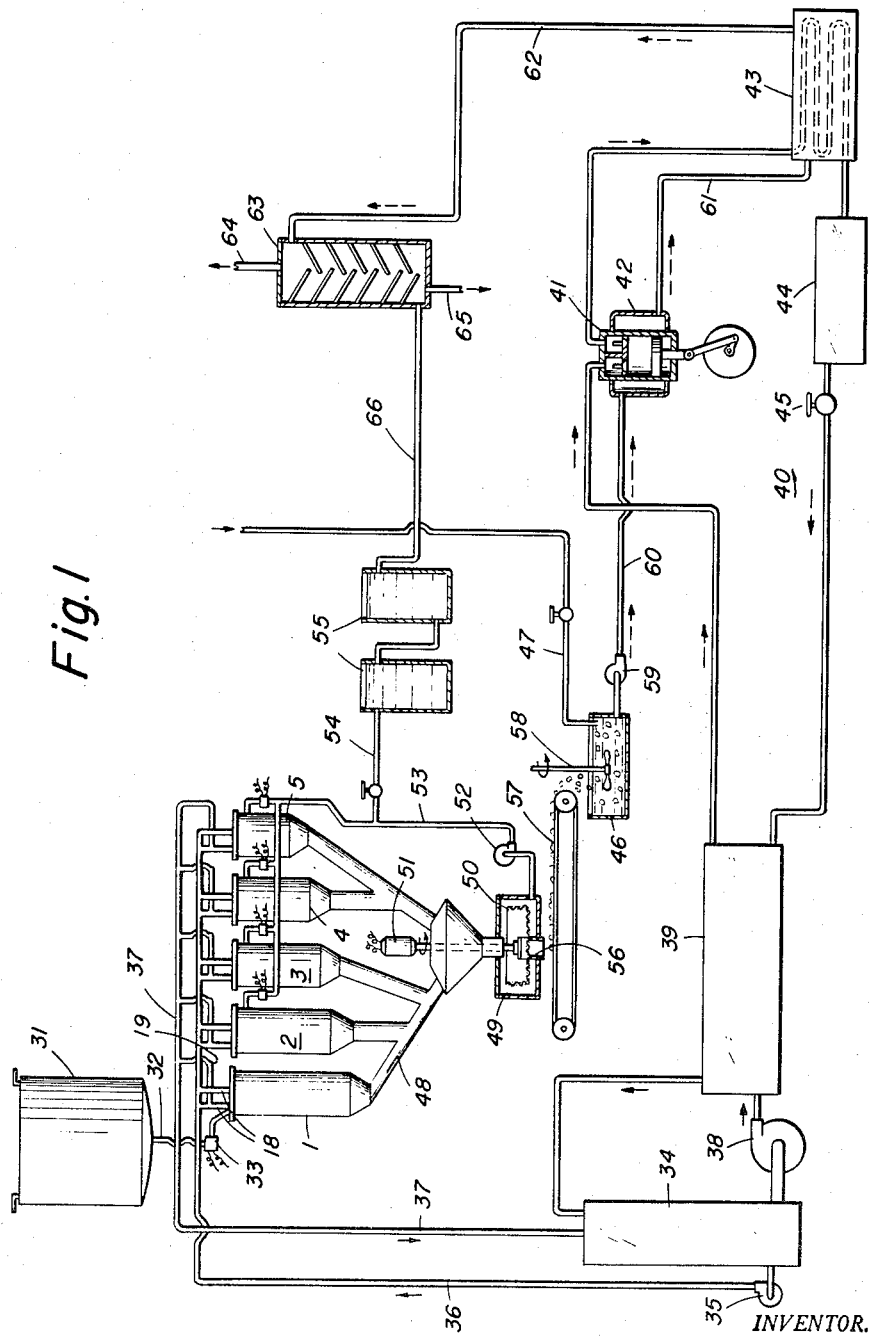
Figure 1 is a diagrammatic view of a step-freeze system wherein the cold side of the refrigeration unit is connected to the freeze tanks, and the hot side of the refrigeration unit is connected to a tank which receives the ice crystals removed in the freeze tanks.

Returning now to the drawings, more particularly to Figure 1 wherein like reference symbols indicate the same parts throughout the various views, a plurality of freezing tanks for the step-freeze system are indicated at 1 through 5. Although the freezing tanks are progressively smaller as indicated in Figure 1, the structure of the tanks is similar and is illustrated in Figure 4.

Figure 4:
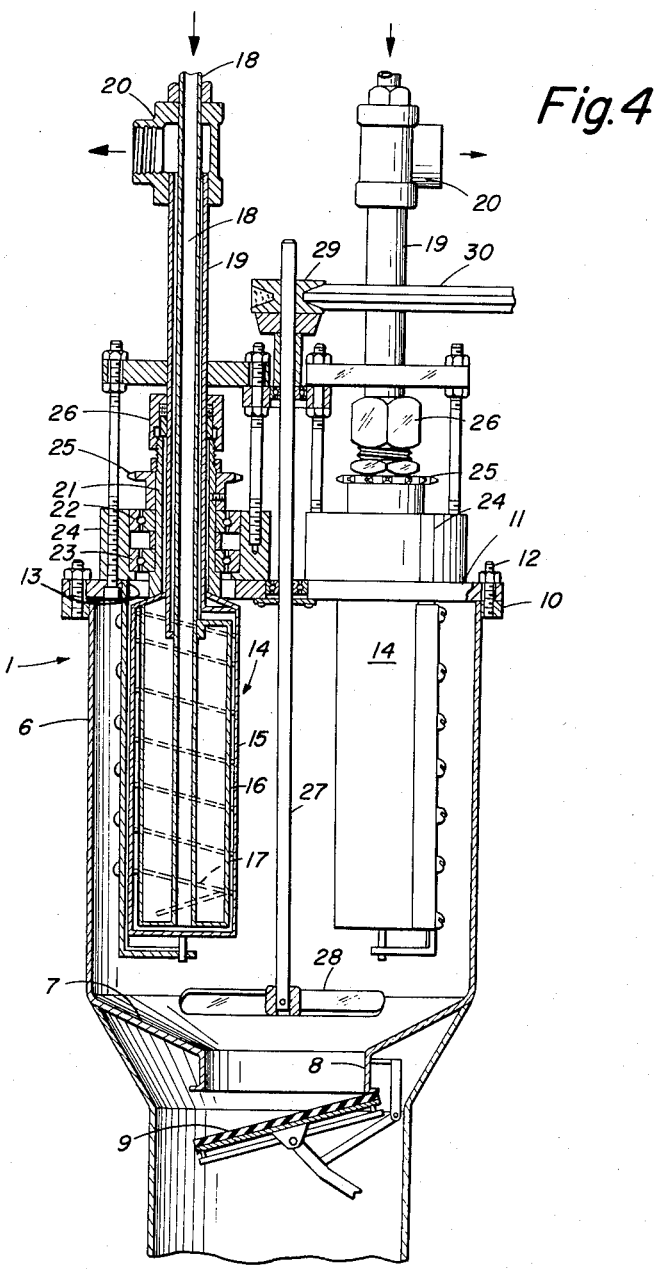
Figure 4 is a partial sectional view of one of the freeze tanks employed in the step-freeze system.

The freezing tank 1 as illustrated in Figure 4 comprises a receptacle-like body 6, having an inclined bottom 7 in the center of which is an opening 8. A plate valve 9 which may be hydraulically, spring or mechanically operated is employed to close the opening 8. The plate valve 9 functions to quickly dump the contents of the freeze tank when desired.

The top of the tank is provided with a ring flange 10 to which is bolted a cover 11 by bolts 12. The cover 11 has a pair of openings 13 therein, through each of which extends a freezing tube 14 which is rotatably supported upon the cover 11.

The freezing tube 14 comprises an outer wall 15 and an inner wall 16 spaced therefrom. A helical baffle 17 is interposed between the inner and outer walls of the freezing tube in order to form a helical path therebetween.

Refrigerant is introduced into the bottom of the freezing tube 14 through a pipe 18 which is concentrically located within the inner wall 16. When the refrigerant emerges from the helical path formed by the baffle 17, it exits through a pipe 19 which surrounds the pipe 18. A fitting 20 is provided on the top of the exit pipe 19 for return of the refrigerant to the refrigeration system.

The freezing tube 14 is mounted at its upper end to a sleeve 21 which is journalled by bearings 22 and 23 within a recess cup 24 mounted upon the top face of the cover 11. A drive sprocket 25 is secured to the sleeve 21 and is chain driven from a suitable power source to rotate the freezing tube. A seal assembly 26 is threaded upon the upper end of the sleeve 21 to seal the sleeve 21 to the refrigerant exit pipe 19.

A rod 27 is centrally journalled in the cover plate 11 and extends downwardly into the freezing tank adjacent the bottom thereof. A propeller 28 is secured to the lower end of the rod. A drive pulley 29 is attached to the upper end of the rod 27 and is drivingly connected by a belt 30 to a source of power to actuate the propeller.

Returning to Figure 1, the heat-sensitive material which is to be dehydrated within the freeze tanks 1 through 5 is contained within a tank 31 and is delivered through a supply line 32 controlled by solenoid actuated valve 33 to the step freeze tank 1.

The temperatures of the freezing tanks 1 through 5 are lowered by means of brine pumped from a brine sump tank 34 by means of a pump 35 through a pipe 36 which is, in turn, connected to each of the inlet pipes 18 of the freezing tubes located within the freezing tanks. The exit pipe 19 of each freezing tube is connected to a return line 37 which returns the brine to the brine tank 34.

The brine within the sump tank 34 is circulated by the pump 38 into a heat exchanger 39 which lowers the temperature of the brine a predetermined amount. The heat exchanger 39 is cooled by a refrigeration system indicated generally at 40. The refrigeration system 40 is conventional and comprises a compressor 41 surrounded by a jacket 42, a condenser 43, an ammonia receiver 44, an expansion valve 45, and the heat exchanger 39 which is the evaporator of the refrigeration system. Commercial type ammonia is employed as a refrigerant within the refrigeration system. The hot side of the refrigeration system 40 is represented by the condenser 43 where heat is discharged from the ammonia refrigerant as it passes therethrough.

Conversely, the cold side of the refrigeration system is at 39 where the ammonia refrigerant absorbs heat within the evaporator or heat exchanger 39.

The hot side of the refrigeration system 40 is connected to a tank 46 which contains a mixture of the ice crystals removed from the material in the freezing tanks and water introduced through a water supply line 47. As each dump valve 9 of each freezing tank is opened, the slushy mass of ice crystals and dehydrated material within the freezing tank is discharged through a discharge conduit 48 into a centrifuge 49. The centrifuge 49 comprises a rotatable basket 50 powered by a motor 51. As the dehydrated material is separated from the ice crystals by centrifugal action of the rotating basket 50, material is urged by the pump 52 through the pipe line 53 where it may be returned to the next freezing tank for a subsequent freezing step at a lower temperature.

A portion of the dehydrated material may be diverted through the line 54 into the reconstitution tanks 55, where sugars or any other substance may be added to the dehydrated material.

Returning to the centrifuge 49 the ice crystals within the cage 50 are dumped through a central opening 56 onto a powered conveyor 57. The ice crystals are then conveyed to tank 46 where they are intermixed with water and agitated by a stirring apparatus indicated at 58. The resultant mixture is a slush which is pumped by a pump 59 through a line 60 to the jacket 42 of the refrigeration compressor 41. The temperature of the slush prior to entering the cooling jacket of the compressor is of the order of 35 to 40° F. The passage of the slush through the cooling jacket 42 results in melting virtually all the ice crystals therein.

The melted water is subsequently circulated through a line 61 to the condenser 43 where said water absorbs additional heat from the ammonia refrigerant being condensed therein. The warmed water is then conveyed through a line 62 to an evaporator or spray drier 63. Action of the evaporator 63 concentrates the warm solution entering through the line 62 by evaporating a major portion of the water therefrom. The resulting condensate is a concentrated solution of entrained solids, sugars and some water. The vapors in the evaporator 63 are removed through a conduit 64 which is connected to a source of vacuum. The concentrate may either be drained from the evaporator as indicated at 65 or conveyed through a pipe line 66 to the reconstitution tanks 55 where it is mixed with the dehydrated material to result in a material of the desired concentration.

With the step freeze system as described, it can be seen that the ice crystals removed from the freeze tanks are employed for cooling the compressor and condenser of the refrigeration system. This results in considerably reducing the cost of refrigeration. In addition, the ice water may be concentrated to reclaim any solids entrained therein.

Figure 2:
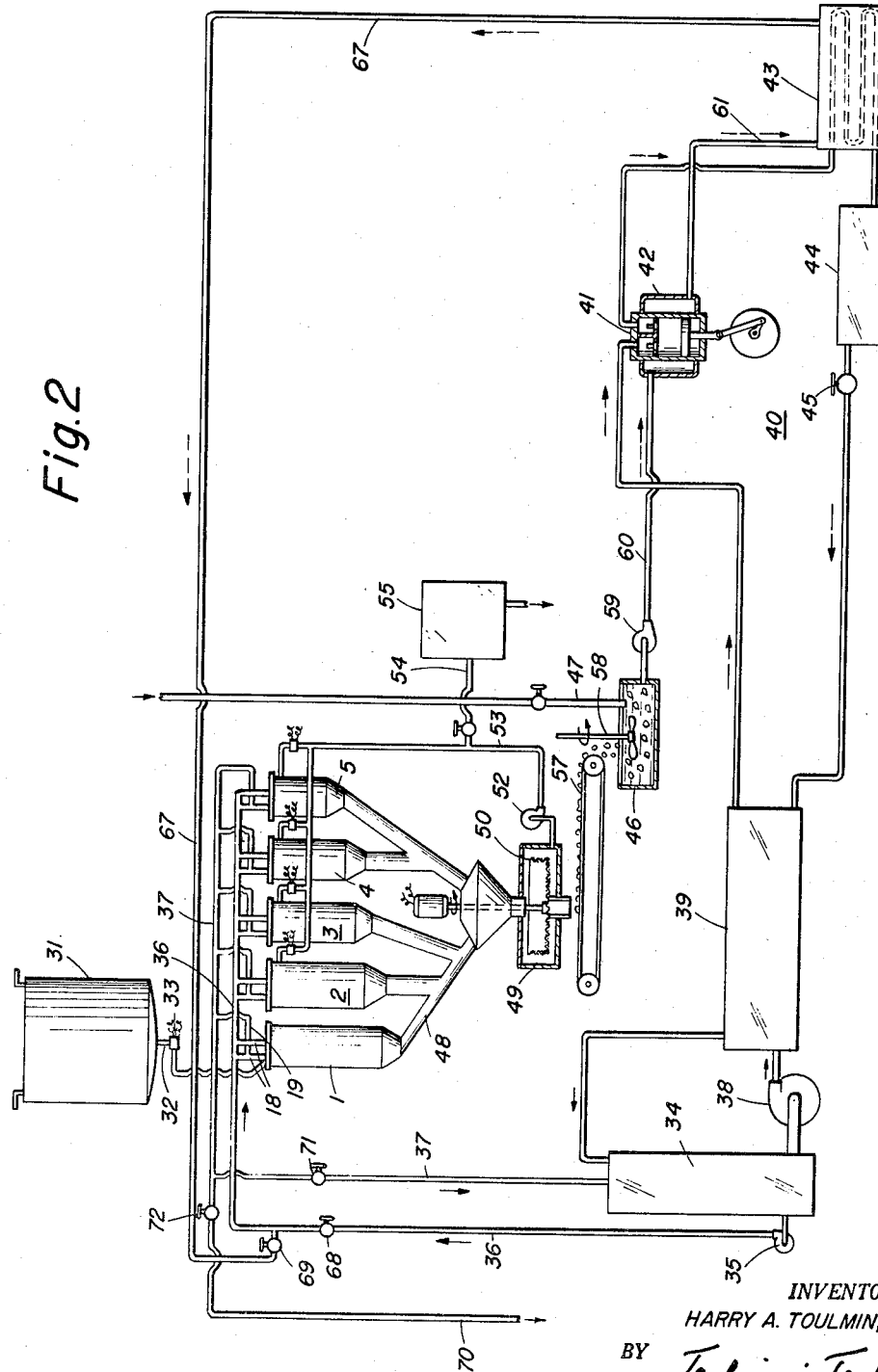
Figure 2 is a diagrammatic view of a step-freeze system wherein the ice crystals removed from the freeze tanks is circulated through the hot side of a refrigeration system and subsequently employed to defrost the freeze tanks.

Proceeding next to Figure 2, there is illustrated a step freeze system wherein the hot side of the refrigerator is connected to the freeze tanks in such a manner that the ice crystals removed from the freeze tanks are used to defrost the tanks of the accumulation of ice on the surfaces thereof. In this arrangement, the melted ice is circulated from the compressor through the pipe 61 to the condenser 43. Upon emerging from the condenser 43 the warmed water is conveyed through a pipe 67 which is connected to the brine supply pipe 36 just above a valve 68. A valve 69 is located within the pipe 67 just above its connection with the brine supply line. A waste discharge line 70 is connected to the brine return line 37 above a valve 71. Similarly, there is a valve 72 connected in the discharge line 70. Therefore, in the system illustrated in Figure 2, the warmed water emerging from the condenser 43 is not piped into an evaporator but is conveyed directly to the brine supply line.

When defrosting the freezing tanks 1 through 5, the valves 68 and 71 are closed to stop the circulation of brine. Valves 69 and 72 are opened. The opening of the valve 69 admits the warm water into the brine supply line where it is circulated through the freezing tubes 14 in a manner similar to that of the brine. The circulation of the warmed water through the freezing tubes melts the accumulation of ice about the freezing tubes and adjacent surfaces of the freezing tank. When the defrosting water emerges from the freezing tubes it is passed through the open valve 72 through the waste discharge line 70 where it is suitably disposed of as waste.

Upon completion of the defrosting process, the valves 69 and 72 are closed and the valves 68 and 71 are opened to recommence the circulation of brine through the freezing tanks. The batch of heat-sensitive material is delivered into the first step freezing tank 1 from the tank 31 and the step freeze cycle is initiated.

The defrosting of the freezing tanks would require a period of approximately 10 minutes. During the defrosting period it is not necessary to shut down the operation of the entire step freeze system. The continued operation of the refrigeration system assures a supply of warm water for defrosting purposes. In addition, a supply of low temperature brine is accumulated within the brine supply tank.

Figure 3:
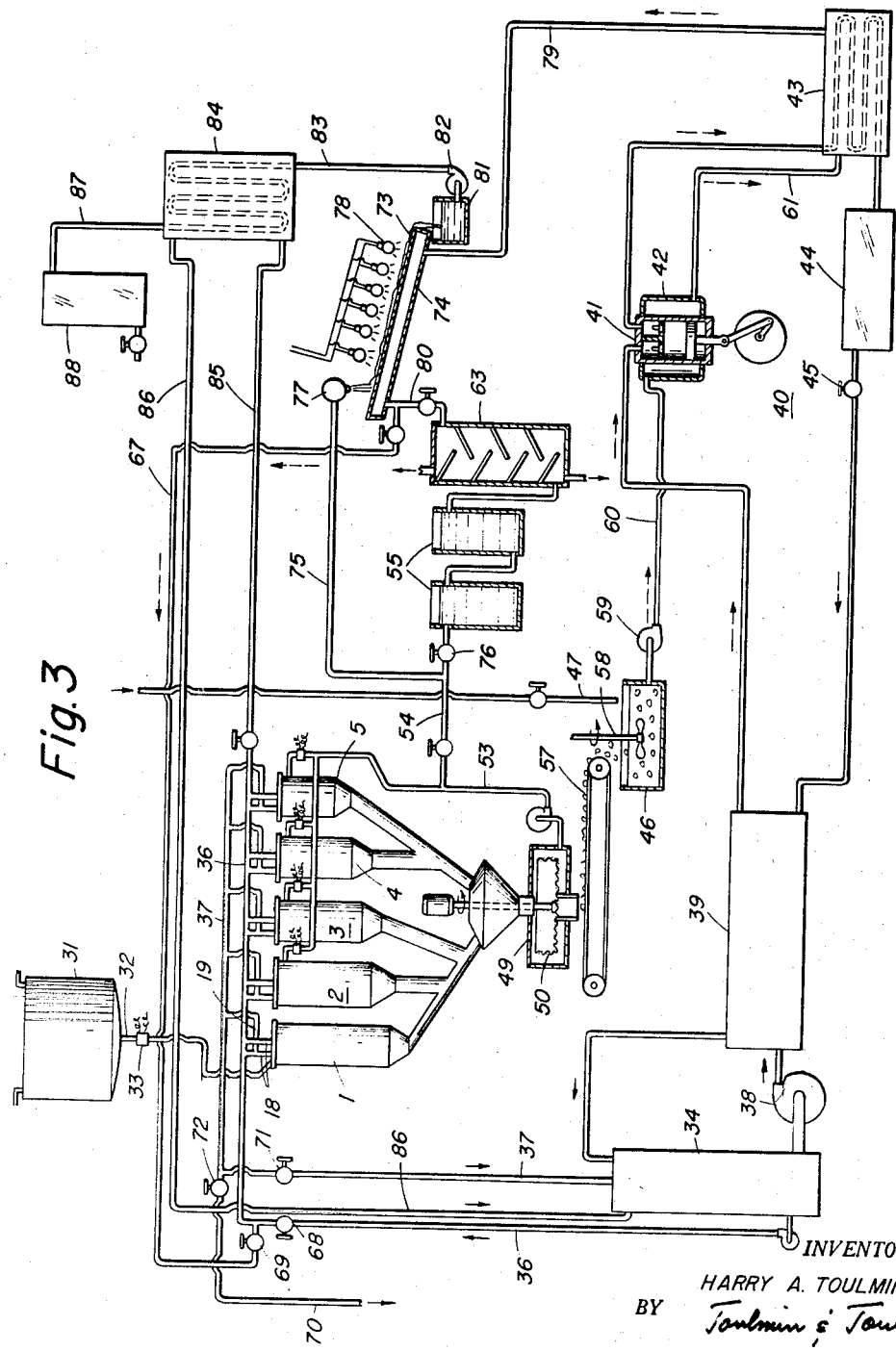
Figure 3 is a diagrammatic view of a step-freeze system wherein the ice crystals removed from the freeze tanks is circulated through the hot side of a refrigeration system, through an asepticizing tank and subsequently employed to defrost the freeze tanks.

Proceeding next to Figure 3, there is illustrated therein a step freeze system wherein ice crystals removed from the step freeze tanks are utilized in aspeticizing the dehydrated product. In addition, the melted ice crystals are used in reclaiming of the entrained solids within the ice crystals and defrosting of the freezing tanks. Ascepticizing of the dehydrated product is achieved by flowing the material over an inclined trough 73 having a flat jacketed back 74. A pipe line 75 is connected to the line 54 before connection with the reconstitution tanks 55. A valve 76 is connected in the line 54 between the line 75 and the tanks 55. The dehydrated juice is conveyed through the pipe line 75 to a distributor 77 which is mounted above the upper end of the trough 73. As the juice passes downwardly along the trough 73 it is exposed to the aspeticizing action of a plurality of aspeticizing lights 78 mounted immediately above the trough 73.

Concurrently with the passage of the dehydrated material along the trough 73 warm water from the condenser 43 is conveyed through a pipe line 79 into the lower end of the jacket 74. As the water emerges from the upper end of the jacket 74, it may selectively pass through a line 80 to the evaporator 63 or through the line 67 for use as a defrosting agent in the freeze tanks. The action of the warm water as it flows through the evaporator 63 or as used as a defrosting agent is similar to that previously described.

Returning to the aspecticized material, the material is collected within a tank 81 as it completes its passage over the aspecticizing trough 73. The aspecticized product is delivered by means of a pump 82 through a line 83 into a cooler 84. The cooler 84 is maintained at a predetermined low temperature by the circulation of brine through a line 85 which is an extension of the brine supply line 36. After the brine has completed its circulation through the cooler 84 it is returned through a line 86 to the brine supply tank 34.

The chilled product is delivered from the cooler 84 through a line 87 into a supply tank 88 where it may be stored and removed as desired.

With the arrangement as illustrated in Figure 3, the ice crystals removed from the freeze tanks are employed to cool units of the refrigeration system, to aspeticize the dehydrated product, to defrost the freeze tanks and to serve as a reconstituting substance for the dehydrated material. Consequently, the cost of operation of a step freeze system employing these features is considerably reduced.

Thus it can be seen that the present invention provides an economical step freeze system, wherein the cold side of the refrigeration system is connected to one side of the freeze tanks and the hot side of the refrigeration system is connected to a receptacle collecting ice crystals from the tanks. The resulting connection enables economical use to be made of the ice crystals which are removed from the freeze tanks during the freezing process. With this system it is possible to reduce the refrigeration costs of this process on the order of 50%. Not only are the costs of refrigeration reduced, but solids and sugars which are entrained within the ice crystals may be reclaimed and intermixed with a dehydrated material.

While previous step freeze systems have succeeded in reclaiming some of the solids entrained in the ice crystals, no other use was made of these ice crystals. However, the mere addition of tap water to the ice crystals upon their emergence from the centrifuge enables the ice crystals to be used in numerous ways to increase the efficiency and economy of the step-freeze process. By connecting the hot and cold sides of a refrigeration system in the manner disclosed herein, the source of refrigeration functions both as a heating and cooling apparatus in a step freeze system.

It will be understood that this invention is susceptible to modification in order to adapt it to different usages and conditions, and, accordingly, it is desired to comprehend such modifications within this invention as may fall within the scope of the appended claims.

What is claimed is:

1. In an apparatus for the dehydration of heat sensitive material, means for freezing said material, a refrigeration system having hot and cold sides, means for connecting said cold side to said freezing means for lowering the temperature of the same to form ice crystals in said material, means for separating ice crystals from said dehydrated materials, means for circulating said ice crystals to said hot side whereby said ice crystals are melted and form a solution with heat sensitive material carried in the ice crystals, and means for concentrating the solution emerging from the hot side of said refrigerating system to reclaim solids entrained in said ice crystals.

2. In an apparatus for the dehydration of heat sensitive material, means for freezing said material, a refrigeration system having hot and cold sides, means for connecting said cold side to said freezing means for lowering the temperature of the same to form ice crystals in said material, means for separating ice crystals from said dehydrated material, means for circulating said ice crystals through said hot side whereby said ice crystals are melted and form a solution with heat sensitive material carried in the ice crystals, means for concentrating the solution emerging from said hot side to reclaim solids entrained in said ice crystals, and means for reconstituting said dehydrated material by the addition of said reclaimed solids.

3. In an apparatus for the dehydration of heat sensitive material, means for freezing said material, a refrigeration system including a compressor and having hot and cold sides, means connecting said cold side to said freezing means for lowering the temperature of the same to form ice crystals in said material, means for separating the ice crystals from said dehydrated material, means for collecting said separated ice crystals, means for adding water to said collected ice crystals to form a slush, passage means connecting said collecting means with said compressor, and means for circulating said ice crystals to said compressor whereby ice crystals are melted and form a solution with heat sensitive material carried in the ice crystals.

4. In an apparatus for the dehydration of heat sensitive material, means for freezing said material, a refrigeration system including a compressor and a condenser and having hot and cold sides, means for connecting said cold side to said freezing means for lowering the temperature of the same to form ice crystals in said material, means for separating ice crystals from said dehydrated material, means for collecting said separated ice crystals, means for adding water to said collected ice crystals to form a slush, passage means connecting said collecting means with said compressor and condenser, means for circulating said ice crystals to said compressor and condenser whereby said ice crystals are melted and form a solution with heat sensitive material carried in the ice crystals, and means for concentrating the solution emerging from the condenser to reclaim solids of the solution.

5. In an apparatus for the dehydration of heat-sensitive material; a plurality of tanks maintained at progressively lower temperatures for freezing said material to form ice crystals in said material; a refrigeration system comprising a compressor, condenser and evaporator; a container for a refrigerant; means connecting said container to said tanks to circulate said refrigerant therethrough; means connecting said container and said evaporator to circulate said refrigerant through said evaporator to lower the temperature of said refrigerant; a centrifuge for separating ice crystals from said dehydrated material; a receptacle for collecting said separated ice crystals; means for adding water to said ice crystals to form a slush; passage means connecting said receptacle with said compressor and condenser to circulate the slush therethrough whereby said slush is melted to a solution with heat sensitive material carried therein; means connecting said condenser with said refrigerant circulating means for the flow of warmed solution through said freezing tanks; and means for removing said solution from said tanks after passage therethrough.

6. In an apparatus for the dehydration of heat sensitive material, means for freezing said material, a refrigeration system having hot and cold sides, means connecting said cold side to said freezing means for lowering the temperature of said freezing means to form ice crystals in said material, means for separating said ice crystals from said dehydrated material, means for circulating said ice crystals through said hot side whereby said ice crystals are melted and form a solution with heat sensitive material carried therein and the resulting solution warmed, means for asepticizing the dehydrated material, and means for flowing said warmed solution through said aspecticizing means to warm said dehydrated material.

7. In an apparatus for the dehydration of heat sensitive material as claimed in claim 6, with means for concentrating said solution to reclaim solids entrained in said ice crystals after it emerges from said aspecticizing means.

8. In an apparatus for the dehydration of heat sensitive material as claimed in claim 6, with means for cooling said aspecticized dehydrated product.

9. In an apparatus for the dehydration of heat sensitive material, means for freezing said material, a refrigeration system having hot and cold sides, means connecting said cold side to said freezing means for lowering the temperature of said freezing means to form ice crystals in said material, means for separating ice crystals from said dehydrated material, means for circulating said ice crystals through said hot side whereby said ice crystals are melted and form a solution with heat sensitive material carried therein and the resulting solution warmed, means for asepticizing the dehydrated material, means for flowing said warmed solution through said aspecticizing means to warm said dehydrated material, means for concentrating said water after it emerges from said aseticizing means to separate out any solids entrained in said ice crystals and to leave warmed water, and means for selectively circulating said warmed water emerging from said aspecticizing means through said freezing means to defrost the same.

10. In an apparatus for the dehydration of heat sensitive material; a plurality of tanks maintained at progressively lower temperatures for freezing said material to form ice crystals therein; a refrigeration system comprising a compressor, condenser and evaporator; a container for a refrigerant; means connecting said container to said tanks to circulate said refrigerant therethrough; means connecting said container and said evaporator to circulate said refrigerant through said evaporator to lower the temperature of said refrigerant; a centrifuge for separating said ice crystals from said dehydrated material; a receptacle for collecting said separated ice crystals; passage means connecting said tank and said compressor and condenser to circulate the ice crystals therethrough; a jacketed trough with the jacket thereof connected to said condenser for the circulation of warm water through said jacket; asepticizing lamps positioned above said trough; and means for flowing said dehydrated material along said trough for the asepticizing of the same.

References Cited in the file of this patent

UNITED STATES PATENTS

| | | |
|---|---|---|
| 1,931,347 | Gay | Oct. 17, 1933 |
| 2,142,734 | Polley | Jan. 3, 1939 |
| 2,257,801 | Hull | Oct. 7, 1941 |
| 2,288,587 | Kalischer | June 30, 1942 |
| 2,507,632 | Hickman | May 16, 1950 |
| 2,552,524 | Cunningham | May 15, 1951 |
| 2,552,525 | Wenzelberger | May 15, 1951 |
| 2,569,113 | Munshower | Sept. 25, 1951 |
| 2,613,513 | Shields | Oct. 14, 1952 |
| 2,614,048 | Wenzelberger | Oct. 14, 1952 |
| 2,650,882 | Sperti | Sept. 1, 1953 |
| 2,657,555 | Wenzelberger | Nov. 3, 1953 |
| 2,666,304 | Ahrel | Jan. 19, 1954 |
| 2,666,707 | Beu | Jan. 19, 1954 |
| 2,800,001 | Wenzelberger | July 23, 1957 |